(12) United States Patent
Kyrolainen et al.

(10) Patent No.: US 10,103,823 B1
(45) Date of Patent: Oct. 16, 2018

(54) RADIO CHANNEL EMULATOR HAVING A DYNAMICALLY-VARIABLE CHANNEL MODEL FOR USE IN TESTING BASE STATIONS AND USER EQUIPMENT (UE) THAT PERFORM ANALOG BEAM FORMING

(71) Applicant: Keysight Technologies, Inc., Minneapolis, MN (US)

(72) Inventors: Jukka Kyrolainen, Oulu (FI); Ville Tuomo Heino, Oulu (FI); Pekka Kyosti, Oulu (FI); Antti Koistinen, Oulu (FI)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/721,757

(22) Filed: Sep. 30, 2017

(51) Int. Cl.
*H04B 17/00* (2015.01)
*H04B 17/391* (2015.01)
*H04W 24/06* (2009.01)
*H04B 7/08* (2006.01)
*H04B 7/06* (2006.01)
*H04B 7/0426* (2017.01)
*H04B 15/00* (2006.01)

(52) U.S. Cl.
CPC ......... *H04B 17/0087* (2013.01); *H04B 7/043* (2013.01); *H04B 7/0615* (2013.01); *H04B 7/086* (2013.01); *H04B 17/3912* (2015.01); *H04W 24/06* (2013.01)

(58) Field of Classification Search
CPC ............ H04B 17/0087; H04B 17/3912; H04B 7/043; H04B 7/0615; H04B 7/086; H04W 24/06

USPC .......................................... 455/67.11–67.16
See application file for complete search history.

(56) References Cited

U.S. PATENT DOCUMENTS 9,077,415 B2   7/2015   Josiam et al.
9,407,381 B2   8/2016   Kyosti et al.
(Continued)

FOREIGN PATENT DOCUMENTS

WO   2017091713 A1   6/2017

OTHER PUBLICATIONS

Notice of Allowance dated Apr. 20, 2018, U.S. Appl. No. 15/721,754, 20 pgs.
(Continued)

*Primary Examiner* — Lee Nguyen (57) ABSTRACT

A test system is provided that for testing base stations (BSs) and user equipment (UE) that includes a radio channel (RC) emulator having a dynamically-variable channel model that is configured to be dynamically varied in accordance with beam indices received in the RC emulator from the BS and/or the UE, depending on implementation scenario and on whether the BS or the UE is the DUT. The beam indices are used by the BS or US to obtain antenna element weights that are used by analog beam former circuits of the BS or UE, respectively, to weight their antenna elements to cause time-variant antenna beam patterns to be formed by their antenna arrays, which are modelled by the dynamically-variable channel model to generate time-variant signals. The RC emulator performs emulation operations and outputs faded time-variant signals for use by the BS or UE in evaluating characteristics of the DUT.

31 Claims, 6 Drawing Sheets

(56) References Cited

U.S. PATENT DOCUMENTS

| | | |
|---|---|---|
| 9,742,508 B1 | 8/2017 | Kyosti et al. |
| 2011/0200084 A1 | 8/2011 | Griesing et al. |
| 2011/0306306 A1* | 12/2011 | Reed .................. H04B 17/0085 |
| | | 455/67.11 |
| 2012/0309323 A1 | 12/2012 | Guo et al. |
| 2014/0024318 A1* | 1/2014 | Sevindik ............... H04W 24/06 |
| | | 455/67.14 |
| 2016/0212641 A1 | 7/2016 | Kong et al. |
| 2016/0233970 A1 | 8/2016 | Reed |
| 2016/0285572 A1 | 9/2016 | Manghal et al. |
| 2016/0344490 A1 | 11/2016 | Foegelle |
| 2017/0019154 A1 | 1/2017 | Reed |
| 2017/0184698 A1 | 6/2017 | Rueth |
| 2017/0373773 A1 | 12/2017 | Jing et al. |
| 2018/0062971 A1 | 3/2018 | Kyosti et al. |

OTHER PUBLICATIONS

Jiann-Ching Guey et al., "Modeling and Evaluation of Beam Tracking in Mobile Millimeter Wave Communication", 2015 IEEE 26th International Symposium on Personal, Indoor and Mobile Radio Communications—(PIMRC): Fundamentals and PHY, pp. 775-780.

\* cited by examiner

RADIO CHANNEL EMULATOR HAVING A DYNAMICALLY-VARIABLE CHANNEL MODEL FOR USE IN TESTING BASE STATIONS AND USER EQUIPMENT (UE) THAT PERFORM ANALOG BEAM FORMING

BACKGROUND

In wireless systems, such as multiple input multiple output (MIMO) wireless systems, for example, multiple antennas are used on both the base station and on the mobile device to exploit a phenomenon known as multipath propagation in order to achieve higher data rates. In general, wireless systems such as MIMO systems simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals. MIMO technology has been standardized in various wireless communications standards including Institute of Electrical and Electronics Engineers (IEEE) 802.11n, IEEE 802.11ac, HSPA+ (3G), WiMAX (4G) and Long Term Evolution (LTE) standards.

Base stations and mobile devices of wireless systems require testing. A typical test system for testing a mobile device under test (DUT) includes a base station or base station emulator (BS), a radio channel (RC), or fading, emulator, the mobile device under test (DUT), a personal computer (PC), some type of multi-probe configuration, and various electrical cables for interconnecting the components. This same test system configuration can be used to test the BS when the BS is the DUT. In some test systems, the output ports of the fading emulator are connected to the antenna ports of the DUT by electrical cables. This type of test system is known as a conducted test system.

The latest generation of wireless systems is the $5^{th}$ generation wireless system, commonly abbreviated as "5G." It is expected that 5G wireless systems that operate in the millimeter wave spectrum (mmWave), which is between 30 GHz and 300 GHz, will employ integrated analog beam-forming with fast dynamic beam switching in both the BS and the user equipment (UE) (e.g., a mobile device). It is not expected that analog beamformers will be applied at frequencies below 6 GHz, although the current signaling specification draft does not preclude it. For 5G wireless systems, OTA test methods and systems will be used to test the BS and the UE if RF antenna connectors at each antenna element are not available. It is expected that connectors for conductive radio channel emulation will be available at RF or intermediate frequency (IF) on an antenna port basis rather than on a per antenna element basis. Each antenna port will be connected to multiple antenna elements and analog beamforming with a fixed set of element weighting coefficients will be applied at each antenna port such that a different beam state may be chosen for each orthogonal frequency division multiplexing (OFDM) symbol.

No current solutions are available for performing conductive emulation analog beamforming with time-variant beams in 5G wireless systems. Accordingly, a need exists for an RC emulator that is suitable for use in testing BSs and UE of 5G wireless systems and that has an RC model that is capable of being dynamically updated in accordance with time-variant beam patterns formed by analog beam formers of 5G BSs and UE.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

The inventive principles and concepts are directed to a test system and method for testing base stations (BSs) and user equipment (UE). The test system includes a radio channel (RC) emulator having a dynamically-variable channel model that is configured to be dynamically varied in accordance with beam indices received in the RC emulator from the BS and/or UE, depending on implementation scenario and on whether the BS or the UE is the DUT. The BS or UE, depending on which is the DUT, uses the beam indices to obtain antenna element weights that are used by analog beam former circuits of the BS or UE to weight their antenna elements to cause time-variant antenna beam patterns to be formed by their respective antenna arrays. The time-variant antenna beam patterns are modelled by the dynamically-variable channel model of the RC emulator to generate time-variant signals. The RC emulator performs emulation operations on the time-variant signals and outputs faded time-variant signals for use by the BS or UE in evaluating characteristics of the DUT.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Figure 1:
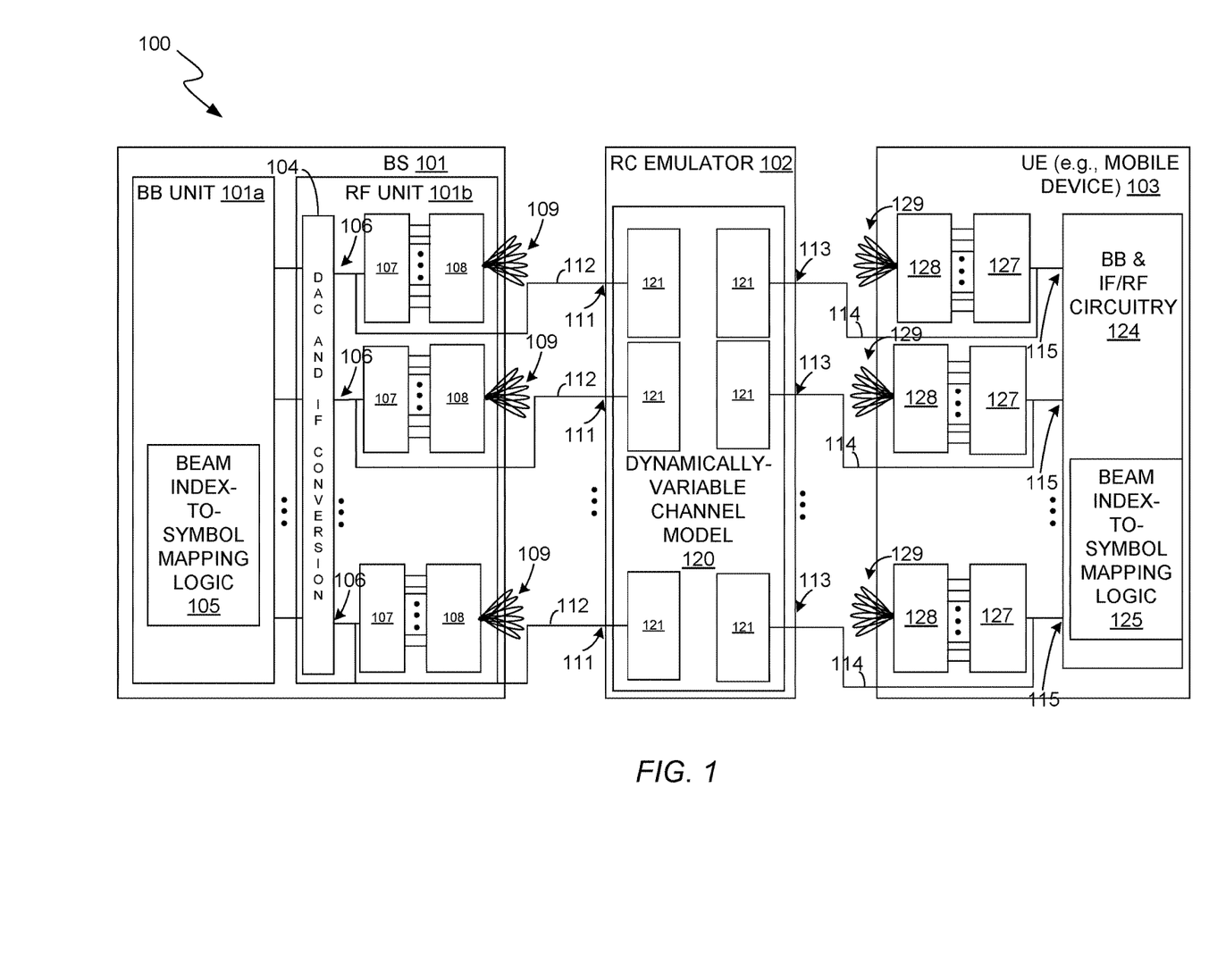
FIG. 1 is a schematic block diagram of a test system in accordance with a representative embodiment that is suitable for testing a 5G DUT.

FIG. 1 illustrates a block diagram of the test system 100 in accordance with an exemplary, or representative, embodiment that is suitable for, but not limited to, testing 5G BSs and UE (e.g., a mobile device). In accordance with this illustrative embodiment, the test system 100 comprises a 5G BS 101, an RC emulator 102 and 5G UE 103, which, for exemplary purposes, is assumed to be a 5G mobile device, such as a 5G smart phone, for example. Either the BS 101 or the UE 103 may be the DUT. The following description assumes that the UE 103 is the DUT and describes the manner in which the test system 100 is used to test the UE 103. If the BS 101 is being tested, the UE 103 may be an actual UE or it may be a UE emulator. The term "UE," as that term is used herein, denotes an actual UE or a UE emulator, and the term "BS," as that term is used herein, denotes an actual BS or a BS emulator. It should be noted that in cases in which the BS 101 is a BS emulator, the RC emulator 102 may be part of, and internal to, the BS emulator.

The BS 101 has a baseband (BB) unit 101a that generates radio frames that are made up of OFDM symbols. The BB unit 101a includes beam indices-to-symbol mapping logic 105 that maps beam indices to symbols within each radio frame. The structure of the radio frame that is used is implementation dependent, and therefore the inventive principles and concepts are not limited to any particular radio frame structure. A Verizon 5G Test Plan For Air Interface provides that each radio frame is 10 millisecond (ms) in duration and to has one-hundred slots, with each slot having a length of $T_{slot}=15360 \times T_S=0.1$ ms, where $T_S=1/(75000 \times 2048)$, where two consecutive slots form a subframe, and where each slot contains seven OFDM symbols. However, other frame structures may be used, as will be understood by those skilled in the art. For illustrative purposes, it will be assumed that the radio frames generated by the BS 101 and by the UE 103 have the above-described frame structure.

The BB unit 101a generates the radio frames that are made up of the OFDM symbols, each of which has a plurality of beam indices associated with it. It should be noted that while the representative embodiments are being described with reference to the use of OFDM symbols, the inventive principles and concepts are not limited to the use of OFDM symbols, as will be understood by those of skill in the art in view of the description provided herein.

Assuming the BS 101 has N BS antenna ports 106, where N is a positive integer that is greater than or equal to 2, N different beam indices may be allocated to the N BS antenna ports 106, respectively, during each OFDM symbol period. The BB unit 101a uses the beam indices-to-symbol mapping logic 105 to obtain the beam indices corresponding to each OFDM symbol. Each beam index allocated to each BS antenna port 106 is a number that corresponds to a vector of weights comprising one complex coefficient (an amplitude value and a phase value represented as a complex number) for each antenna element. An RF unit 101b of the BS 101 includes a digital-to-analog converter (DAC) and IF converter block 104, N BS analog beam former circuits 107, and N BS antenna arrays 108. The N BS analog beam former circuits 107 are located at the N BS antenna ports 106, respectively. The DAC and IF converter block 104 converts digital BB signals output from the BB unit 101a, which include information from which the beam index sequences can be decoded, into analog IF signals. The IF signals have a known frame structure and include control information that can be extracted and decoded by the RC emulator to obtain the beam indices and the corresponding beam index sequence. The beam indices or antenna element weights are typically passed to the analog beam former circuits 107 via an internal interface (not shown) of the BS 101.

The N analog beam former circuits 107 generate N respective weights from the N respective beam indices. The N weights are used to weight BS antenna elements of one of N respective BS antenna arrays 108 to cause the N respective BS antenna arrays 108 to form N time-variant BS antenna array beam patterns 109, respectively. In accordance with this representative embodiment, the time-variant beam pattern that is formed at each BS antenna port 106 can be changed by the BS 101 at least once per symbol period. In accordance with this representative embodiment, at any given time instant, a BS antenna array beam pattern 109 is formed at each BS antenna port 106, and each of these beam patterns can be different. Thus, the BS 101 uses the weights to selectively control the time-variant BS antenna array beam patterns 109 that are formed by the respective BS antenna arrays 108.

The RC emulator 102 has N RC input/output (I/O) ports 111 that are electrically coupled by respective electrical cables 112 to the N BS antenna ports 106, respectively. The RC emulator 102 has M RC I/O ports 113, which, in accordance with this representative embodiment, are electrically coupled by respective electrical cables 114 to respective UE antenna ports 115 to enable the UE 103 to be subjected to conductive testing, where M is a positive integer that is greater than or equal to 2. In other embodiments, the UE 103 is placed inside of an anechoic chamber (not shown) for OTA testing, in which case the RC I/O ports 113 are connected by the electrical cables 114 to antenna probes (not shown) of the anechoic chamber.

The RC emulator 102 has a dynamically-variable channel model 120 that is configured to be dynamically varied in accordance with the beam indices. The RC I/O ports 111 receive signals that are output from the respective BS antenna ports 106 and that contain information from which the beam indices are obtained. The dynamically-variable channel model 120 is typically implemented as a combination of hardware and software and/or firmware that is executed by the RC emulator 102. For example, the RC emulator 102 typically includes one or more processors for executing computer instructions and one or more memory devices for storing computer instructions and possibly data. The dynamically-variable channel model 120 is configured to be dynamically varied in accordance with beam state information extracted from the beam indices such that the time-variant BS antenna array beam pattern 109 that is formed by each BS antenna array 108 is simulated by respective beam modeling logic 121 at each respective RC I/O port 111. The simulated time-variant BS antenna array beam patterns 109 are embedded in the dynamically-variable channel model 120 of the RC emulator 102. Each beam index defines a beam state and each beam state defines a particular beam pattern having a particular directionality.

The RC emulator 102 also performs the typical RC emulation operations, i.e., fading operations, as the signals that are received at the RC I/O ports 111 propagate along channels of the RC emulator to the M RC I/O ports 113. Thus, an electrical signal corresponding to a faded time-variant beam pattern generated by respective beam modeling logic 121 is produced by the RC emulator 102 and output at each RC I/O port 113 and delivered via one of the electrical cables 114 to a respective UE antenna port 115.

The RC emulator 102 preferably is configured to sample at least one of the signals that are output from the BS antenna ports 106 and received by a respective one of the RC I/O ports 111 to perform frame and symbol synchronization to synchronize the RC emulator 102 with the BS 101. This synchronizes the time-variant beam pattern generation that is performed by the beam modeling logic 121 with the time-variant beam pattern generation that is performed by the respective BS antenna arrays 108. After performing frame and symbol synchronization, the RC emulator 102 extracts the beam state information from the beam indices that are contained in the signals that are output from the BS antenna ports 106 and received by the respective RC I/O ports 111 and to embed the extracted beam state information in the dynamically-variable channel model 120. The RC emulator 102 is configured to emulate the dynamically-variable channel model 120 on one or more channels of the RC emulator 102 using channel model coefficients that are calculated based at least in part on the extracted beam state information.

The frame and symbol synchronization can be performed by the RC emulator 102 either once at the beginning of the test, or continuously or periodically during the test by measuring the transmission of the BS 101 or of a BS emulator (not shown) in the event that a BS emulator is used in lieu of a BS. The synchronization measurement can be performed by exploiting the known structures of the signals that are output from the BS antenna ports 106. If the BS 101 has RF connectors, the RC emulator 102 can sample and down-convert the RF signals that are output from the BS antenna ports 106 and received at each of its RC I/O ports 111, perform time and frequency synchronization and detect and decode necessary information of the signal structure to extract frame and symbol synchronization parameters. The synchronization procedure may be based on algorithms similar to those used by typical UE (e.g., a mobile phone) in communication with BS to perform synchronization, which is typically based on decoding Primary Synchronization Signal (PSS), Secondary Synchronization Signal (SSS) and/or exploiting a known pilot sequence transmitted on each BS transmit antenna port.

Alternatively, if decoding of beam state information in the RC emulator 102 is not necessary, it is possible to synchronize via a trigger signal from the BS 101 or from a BS emulator. The beam state information is used to apply the time-variant beam states during the emulation operations that are performed by the RC emulator 102. For each time instant, the BS 101 and the UE 103 each have an active beam index that defines a respective beam state. This pair of active beam indexes is referred to herein as Tx/Rx beam index pair. In most cases, the dynamically-variable channel model 120 of the RC emulator 102 models both the BS antenna array beam patterns 109 generated by the BS 101 and the UE antenna array beam patterns 129 generated by the UE 103. In such cases, the terms "beam state" or "beam state information" correspond to active beam indexes of the BS 101 and to active beam indexes of the UE 103. In such cases, the beam states are defined by respective Tx/Rx beam index pairs, which are embedded by the RC emulator 102 in the dynamically-variable channel model 120. In some cases, the dynamically-variable channel model 120 of the RC emulator 102 models either the BS antenna array beam patterns 109 or the UE antenna array beam patterns 129, but not both. In those cases, the terms "beam state" or "beam state information" correspond to active beam indexes of the BS 101 or to active beam indexes of the UE 103, depending on whether the BS antenna array beam patterns 109 or the antenna array beam patterns 129 are being modeled in the RC emulator 102.

Beam state sequences can be fixed and pre-configured in advance in the RC emulator 102 in some cases. In such cases, the beam state information can be exploited in advance during the channel model/emulation generation phase. The dynamically-variable channel model 120 is built prior to running the emulation in the RC emulator 102. File-based systems and channel modeling tools are available that can be used to generate the dynamically-variable channel model 120 and to write the channel model coefficients into one or more files. The RC emulator 102 then "plays" these files back when executing the emulation. If the beam state sequences are known in advance, it is relatively easy to generate the dynamically-variable channel model 120 and write it into the corresponding file(s), but it is not very easy to play the files back in the RC emulator 102 due to the high update rate requirement. Therefore, multiple options are described below for executing the dynamically-variable channel model 120 in a file-based RC emulator 102.

If the beam state sequences are not fixed and pre-configured in advance, the beam state sequences can be dynamically scheduled by detecting and decoding downlink control information (DCI) or other control information contained in the signals that are received at the RC I/O ports 111 from the BS antenna ports 106. In normal downlink signaling, these signals from the BS 101 include beam state information that can be decoded by the RC emulator 102 and by the UE 103. The DCI or other control information contains the beam index-to-symbol index mapping information, which can be detected and decoded to obtain the beam state scheduling information. The beam state scheduling information is typically signaled one to twenty subframes in advance of the corresponding beam states, and thus decoding must be performed almost in real time. Another way to dynamically schedule a beam state sequence is to provide a separate communication interface between the BS 101 or BS emulator and the RC emulator 102 over which beam state sequence information is signaled. The communication interface may be, for example, a digital communication interface comprising a fast serial link over which signals that include synchronization and timing information are sent.

BB and IF circuitry 124 of the UE 103 generates radio frames that are made up of symbols, which, for exemplary purposes are assumed to be OFDM symbols. The BB and IF circuitry 124 includes beam indices-to-symbol mapping logic 125 that maps beam indices to symbols within each radio frame. The radio frames are made up of the symbols, each of which has a plurality of beam indices associated with it. M different beam indices can be allocated to the M respective UE antenna ports 115 during each symbol period. The BB and IF circuitry 124 uses the beam indices-to-symbol mapping logic 125 to obtain the beam indices corresponding to each symbol. Each beam index allocated to each respective UE antenna port 115 is a number that corresponds to a vector of weights comprising one complex coefficient for each antenna element. The UE 103 has M UE analog beam former circuits 127 located at the M UE antenna ports 115, respectively, that use M respective weights associated with the M respective beam indices to weight UE antenna elements of one of M respective UE antenna arrays 128 to cause the M respective UE antenna arrays 128 to form M time-variant UE antenna ray beam patterns 129, respectively.

In accordance with this representative embodiment, the time-variant UE antenna array beam pattern 129 that is formed at each UE antenna port 115 can be changed by the UE 103 at least four times per symbol period. At any given time instant, a UE antenna array beam pattern 129 can be formed at each UE antenna port 115, and each of these UE antenna array beam patterns 129 can be different from all of the other UE antenna array beam patterns 129. Thus, the UE 103 uses the weights to selectively control the time-variant UE antenna array beam patterns 129 that are formed by the respective UE antenna arrays 128.

When the UE 103 is transmitting, the RC emulator 102 samples at least one of the signals that are output from the UE antenna ports 115 and received by a respective one of the RC I/O ports 111 to perform frame and symbol synchronization to synchronize the RC emulator 102 with the UE 103. This synchronizes the time-variant antenna array beam pattern generation that is performed by the beam modeling logic 121 with the time-variant antenna array beam pattern generation that is performed by the respective UE antenna arrays 128. All of the options described above for performing frame and symbol synchronization between the BS 101 and the RC emulator 102 may also be used to perform frame and symbol synchronization between the UE 103 and the RC emulator 102.

After performing frame and symbol synchronization, the RC emulator 102 extracts beam state information from the signals that are output from the UE antenna ports 115 and received by the respective RC I/O ports 113. The RC emulator 102 is configured to emulate the dynamically-variable channel model 120 on one or more channels of the RC emulator 102 using the extracted beam state information and using channel model coefficients that are calculated based at least in part on the extracted beam state information.

In accordance with a preferred embodiment, if the BS 101 is the DUT and its transmitting capabilities are being tested, the BS 101 and the UE 103 generate the BS and UE antenna array beam patterns 109 and 129, respectively, and the corresponding Tx/Rx beam index pairs are embedded in the dynamically-variable channel model 120 by the RC emulator 102. The RC emulator 102 performs beam modeling and emulation in the manner described above and the UE 103 or a UE emulator receives the faded signals output from the RC I/O ports 113 and analyzes those signals to assess the transmitting capabilities of the BS 101.

If the BS 101 is the DUT and its receiving capabilities are being tested, the UE 103 or a UE emulator and the BS 101 generate the UE and BS antenna array beam patterns 129 and 109, respectively, in the manner described above, and the corresponding Tx/Rx beam index pairs are embedded in the dynamically-variable channel model 120. The RC emulator 102 performs beam modeling and emulation, and the BS 101 receives the faded signals output from the RC I/O ports 111 and analyzes those signals to assess the receiving capabilities of the BS 101.

If the UE 103 is the DUT and its transmitting capabilities are being tested, the UE 103 and the BS 101 or BS emulator generate the UE and BS antenna array beam patterns 129 and 109, respectively, and the corresponding Tx/Rx beam index pairs are embedded in the dynamically-variable channel model 120. The RC emulator 102 performs beam modeling and emulation in the manner described above, and the BS 101 or a BS emulator receives the faded signals output from the RC I/O ports 111 and analyzes those signals to assess the transmitting capabilities of the UE 103.

If the UE 103 is the DUT and its receiving capabilities are being tested, the BS 101 or a BS emulator and the UE 103 generate the BS and UE antenna array beam patterns 109 and 129, respectively, in the manner described above, and the corresponding Tx/Rx beam index pairs are embedded in the dynamically-variable channel model 120. The RC emulator 102 performs beam modeling and emulation in the manner described above, and the UE 103 receives the faded signals output from the RC I/O ports 113 and analyzes those signals to assess the receiving capabilities of the UE 103.

Although the active beam indices of both link ends are typically embedded in the dynamically-variable channel model 120, in some embodiments, the link end opposite the DUT has a single, fixed beam state or has a beam state sequence that is fixed in advance.

If the beam state sequence is a fixed beam state sequence that is known in advance, the beam state sequence can be embedded in the dynamically-variable channel model 120 prior to performing testing. If the beam state sequence is not known in advance, the beam state sequence is typically sent as part of normal signaling by the BS 101 and by the UE 103 to the RC emulator 102, which detects and decodes the beam state sequence information and uses it to dynamically vary the dynamically-variable channel model 120 in near real-time. If the beam state sequence is not known in advance, and therefore is to be dynamically scheduled, near real-time adaptation of the dynamically-variable channel model 120 is performed in the RC emulator 102. For this, the RC emulator 102 should have a high sample rate in order to address beam periods of very short duration. In such cases, the beam scheduling information is typically signaled one to twenty frames in advance, and thus detection and decoding is performed in near real-time.

Current channel modeling principles commonly used in 3GPP-specified channel models (e.g., TR.38.901 or TR.36.873) apply antenna responses for each ray of each cluster and the cluster and ray angles to generate time-invariant antenna array beam patterns. In accordance with a representative embodiment, in the dynamically-variable channel model 120, discrete time-variant antenna beam patterns are substituted for the time-invariant antenna beam patterns of the 3GPP-specified channel model as follows:

$$\begin{cases} \begin{bmatrix} F_{rx,u,\theta}(\theta_{n,m,ZOA}, \phi_{n,m,AOA}) \\ F_{rx,u,\phi}(\theta_{n,m,ZOA}, \phi_{n,m,AOA}) \end{bmatrix} \rightarrow \begin{bmatrix} F_{rx,\varsigma,b_i,\theta}(\theta_{n,m,ZOA}, \phi_{n,m,AOA}, t) \\ F_{rx,\varsigma,b_i,\phi}(\theta_{n,m,ZOA}, \phi_{n,m,AOA}, t) \end{bmatrix} \\ \begin{bmatrix} F_{tx,s,\theta}(\theta_{n,m,ZOD}, \phi_{n,m,AOD}) \\ F_{tx,s,\phi}(\theta_{n,m,ZOD}, \phi_{n,m,AOD}) \end{bmatrix} \rightarrow \begin{bmatrix} F_{tx,\xi,\beta_i,\theta}(\theta_{n,m,ZOD}, \phi_{n,m,AOD}, t) \\ F_{tx,\xi,\beta_i,\phi}(\theta_{n,m,ZOD}, \phi_{n,m,AOD}, t) \end{bmatrix} \end{cases},$$

where t is time, $b_i \in \{1, \ldots, B_{rx}\}$ and $\beta_i \in \{1, \ldots, B_{tx}\}$ refer to receiver (Rx) and transmitter (Tx) beam patterns, respectively, within sub-sets B of fixed beam patterns, $\varsigma$ and $\xi$ denote the index of the BS and UE antenna ports 106 and 115, respectively, of Rx and Tx beams, respectively, where a discrete time index $$i = \left\lfloor \frac{t}{T_s} \right\rfloor \in \mathbb{N},$$

where $T_S$ is the discrete time step between the beam state updates, and where $\lfloor \ \rfloor$ denotes a round down (floor) operator; a different beam state may be defined for each discrete time step i or the same beam state may be repeated multiple times depending on the configuration of the test system 100; $F_{rx,u,\theta}$ and $F_{rx,u,\phi}$ are the complex antenna gains of Rx antenna u for polarizations $\theta$ and $\Phi$, respectively; $F_{tx,s,\theta}$ and $F_{tx,s,\phi}$ are the complex antenna gains of Tx antenna s for polarizations $\theta$ and $\Phi$, respectively; $F_{rx,\varsigma,b_i,\theta}$ and $F_{rx,\varsigma,b_i,\phi}$ the complex beam gains of Rx beam number $b_i$ of Rx antenna port $\varsigma$ for polarizations $\theta$ and $\Phi$, respectively; the complex beam gain may be referred to as a beam pattern or beam state and it is a result of calculating the response of an antenna array with weighting coefficients according to a particular beam index; $F_{tx,\xi,\beta_i,\theta}$ and $F_{tx,\xi,\beta_i,\phi}$ are the complex beam gains of Tx beam number $\beta_i$ of Tx antenna port $\xi$ polarizations $\theta$ and $\Phi$, respectively; the complex beam gain may be referred to as a beam pattern or beam state and it is a result of calculating the response of an antenna array with weighting coefficients according to a particular beam index; n and m denote the cluster (propagation path) and the sub-path (ray) indices defined in the geometry-based stochastic channel model; $\theta_{n,m,ZOA}$ and $\phi_{n,m,AOA}$ are the zenith and azimuth angles of arrival of the nth cluster and mth sub-path, respectively; and $\theta_{n,m,ZOD}$ and $\phi_{n,m,AOD}$ are the zenith and azimuth angles of departure of nth cluster and mth sub-path, respectively.

If the RC emulator 102 is a non-file based RC emulator, the channel coefficients for the dynamically-variable channel model 120 are generated on the fly. The beam states can be updated by applying beam state-specific coefficients for each sinusoid during calculation of the channel coefficients. If the RC emulator 102 is a file-based channel emulator, the channel coefficients are generated prior to RC emulation and stored in files inside of the RC emulator 102 that are executed by the RC emulator 102 during RC emulation.

The dynamically-variable channel model 120 can be generated for each pre-defined beam state and beam-specific channel models can run in parallel in the beam modeling logic 121 of the RC emulator 102. One of the parallel channel models can be activated per time instant according to active beam state information. The parallel channel models may run on multiple different physical channels of the RC emulator 102 or on a single physical channel by defining individual sets of clusters/taps for each beam pattern (i.e., multiple overlapping channel taps). In the case of running the dynamically-variable channel model 120 on multiple physical channels of the RC emulator 102, the beam pattern selection is performed by activating (switching on) one channel at a time by a switching mechanism (not shown) while all other channels are deactivated (switched off). The switching can be performed by, for example, a BS emulator if the number of BS emulator output ports is higher than the number of antenna ports required in the test system 100. In the case of running the dynamically-variable channel model 120 on a single physical channel, beam pattern selection is performed by enabling a channel or a set of taps assigned for a given beam pattern while channels or taps assigned for other beam patterns are disabled by, for example, setting those channels to have high attenuation.

The parallel execution of multiple beam patterns generally requires the use of additional channel or tap resources in the RC emulator 102. The parallel resource usage may, however, be reduced by, for example, running a single beam model and updating the amplitudes and phases of each tap/cluster based on the selected beam pattern.

There are multiple options for running the time-variant beam patterns sequentially in the RC emulator 102. A first option is a full-embedding option that involves generating channel model coefficients for all beam pattern combinations in advance. The term "full embedding," as that term is used herein, means that all relevant antenna array characteristics are fully included in the dynamically-variable channel model 120. The term "partial-embedding," as that term is used herein, means that the dynamically-variable channel model 120 is an approximation of the antenna array characteristics that does not yet include all possible effects of the antenna array beam patterns.

For the first full-embedding option, each Tx/Rx beam index pair has a plurality (e.g., twenty-four) fading taps associated with it that will be activated in the RC emulator 102 based on the beam indices received in the RC emulator 102. The channel model of each Tx/Rx beam index pair will be stored in memory of the beam modeling logic 121 and selected for execution according to the Tx/Rx beam index pair that is active at each time instant. Also, in this case, multiple beam patterns may run in parallel, with a single beam pattern being active at a given time instant to enable fast transition between active beam patterns.

A second full-embedding option for running the time-variant beam patterns sequentially in the RC emulator 102 involves calculating, in advance, a table of complex scaling coefficients and Doppler phasor scaling coefficients per Tx/Rx beam index pair for each tap, running a single set of tap coefficients and updating tap gain, phase scaler and Doppler phasor scaler coefficients based on the beam indices received in the RC emulator 102.

A first partial-embedding option for running the time-variant beam patterns sequentially in the RC emulator 102 involves calculating, in advance, a table of gain scaling coefficients for each Tx/Rx beam index pair for each tap, running a single set of tap coefficients and updating only tap gain scaler coefficients based on the beam index received in the RC emulator 102. This option is particularly well suited for cases in which intra-cluster angle spreads are small. The tap gain scaler coefficients should also be time-variant (i.e., slowly changing) in the case of a dynamic model with cluster angle/antenna orientation evolution. This option neglects Doppler phasor changes and inter-port phase differences due to analog beam pattern differences. Antenna array geometry-based phase differences are included and there is no error in inter-port phase difference if the beam patterns of each antenna port are similar. Phase differences among ports are not expected to be relevant if the analog beam patterns per port are different.

A second partial-embedding option for running the time-variant beam patterns sequentially in the RC emulator 102 involves calculating, in advance, a table of complex scaling coefficients for each beam index pair for each tap, running a single set of tap coefficients and updating only tap gain and phase scaler coefficients based on the beam indices received in the RC emulator 102.

As indicated above, current RC emulator solutions perform channel emulation at the center RF frequency of operation of the DUT, whereas RF connectors may not be available in 5G BSs and 5G UE. In 5G BSs and UE, it is expected that IF connectors will be available. In accordance with a representative embodiment, the BS 101 is a 5G BS having IF connectors at the BS antenna ports 106 that are connected by the electrical cables 112 to the respective RC I/O ports 111. Likewise, in accordance with this embodiment, the UE is a 5G UE having IF connectors at the UE antenna ports 115 that are connected by the electrical cables 114 to the respective RC I/O ports 113. BB signals generated by the BB unit 101a of the BS 101 are converted by the BB unit 101a into IF signals, which are output over the IF connectors located at the BS antenna ports 106 and received at the RC I/O ports 111. The RC emulator 102 down-converts the received IF signals into BB signals because RC emulation is performed at the BB frequency. BB signals generated by the BB and IF circuitry 124 of the UE 103 are converted by the BB and IF circuitry 124 of the UE 103 into IF signals, which are output over the IF connectors located at the UE antenna ports 115 and received at the RC I/O ports 113. The RC emulator 102 down-converts the received IF signals into BB signals.

The channel modelling that is performed by the dynamically-variable channel model 120 is performed at a center operating RF frequency of the DUT. This means that the channel model parameterization is performed based on the center operating RF frequency of the DUT and that the channel model sample rate and Doppler modelling are also based on the center operating RF frequency of the DUT. The RC emulator 102 and the DUT can be configured to operate at the IF frequency. In such cases, the RC emulator 102 performs fading emulation at the BB frequency by applying the dynamically-variable channel model 120, which is generated according to the center operating RF frequency of the DUT during testing. After applying fading, the BB signals are up-converted back to the IF frequency before being transmitted from the RC I/O ports 111 or 113 to the BS 101 or to the UE 103. In accordance with this embodiment, different IF frequencies may be used at different link ends, i.e., the BS 101 and the UE 103 may use different IF frequencies, F1 and F2, respectively. If F1 and F2 are not equal, the frequency conversions that are performed at the RC I/O ports 111 and 113 are tuned according to the frequency of the connected device. This also allows a mixed setup where some DUTs are connected at the designated RF frequency and some of the DUTs operate at different RF frequencies or are connected at the IF frequency.

Figure 2:
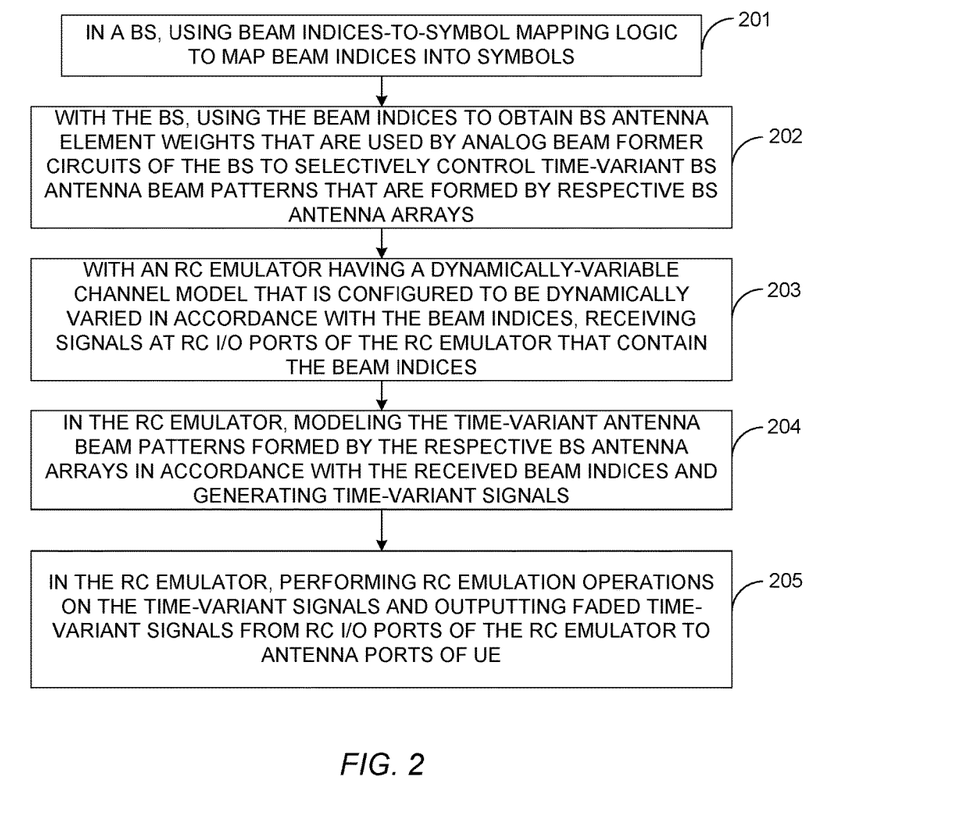
FIG. 2 is a flow diagram representing the test method in accordance with a representative embodiment in which the UE is the DUT.

FIG. 2 is a flow diagram representing the test method in accordance with a representative embodiment in which the UE is the DUT and the test system 100 is being used to evaluate receiver characteristics of the UE 103 (i.e., downlink testing of the UE 103). In a BS, beam indices-to-symbol mapping logic is used to map beam indices into symbols, as indicated by block 201. As described above with reference to FIG. 1, the BS has a plurality of BS antenna ports 106 that are electrically coupled to a plurality of BS antenna elements, and each plurality of BS antenna elements comprises a respective BS antenna array 108. The BS uses the beam indices to obtain BS antenna element weights that are used by analog beam former circuits 107 of the BS 101 to weight the BS antenna elements to thereby selectively control time-variant BS antenna beam patterns 109 that are formed by the respective BS antenna arrays 108, as indicated by block 202. With an RC emulator 102 having a dynamically-variable channel model 120 that is configured to be dynamically varied in accordance with the beam indices, signals that are output from the BS antenna ports 106 and that contain the beam indices are received at RC I/O ports 111 of the RC emulator 102, as indicated by block 203. As indicated above with reference to FIG. 1, the RC emulator 102 preferably samples at least one of the signals that are output from the one of the BS antenna ports 106 and received by a respective one of the RC I/O ports 111 to perform frame and symbol synchronization to synchronize the RC emulator 102 with the BS 101.

In the RC emulator 102, the dynamically-variable channel model 120 models the time-variant antenna beam patterns 109 that are formed by the respective BS antenna arrays 108 and generates time-variant signals, as indicated by block 204. The RC emulator 102 performs RC emulation operations on the time-variant signals and outputs faded time-variant output signals from RC I/O ports 113 of the RC emulator 102 to antenna ports 115 of the UE 103, as indicated by block 205. The faded time-variant output signals can be used to assess, or evaluate, receiver characteristics of the DUT, which in this case is the UE 103. The test system 100 is bidirectional, and therefore uplink testing (UE 103 transmitting and BS 101 receiving) can be performed in the same manner using the same system configuration to evaluate transmitter characteristics of the UE 103.

Figure 3:
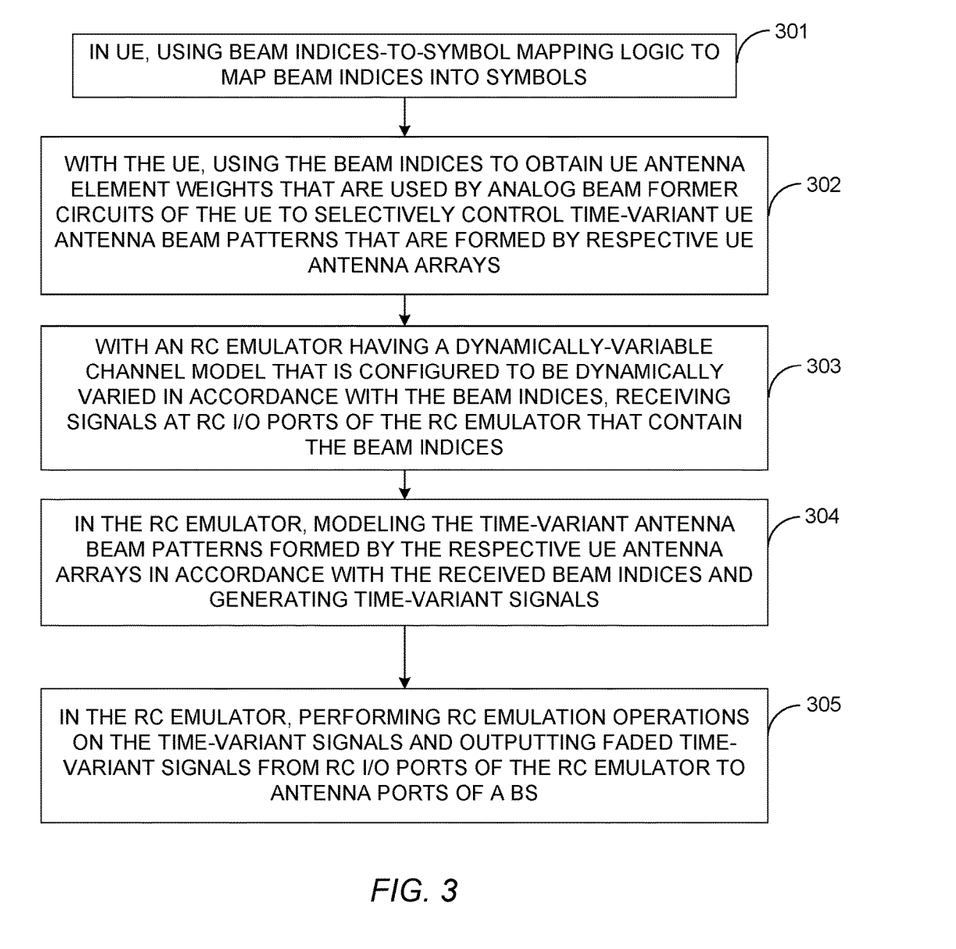
FIG. 3 is a flow diagram representing the test method in accordance with a representative embodiment in which the BS is the DUT.

FIG. 3 is a flow diagram representing the test method in accordance with a representative embodiment in which the BS 101 is the DUT and the test method is being used to test receiver characteristics of the BS 101 (i.e., uplink testing of the BS 101). In a UE (or a UE emulator), beam indices-to-symbol mapping logic 125 of the UE 103 is used to map beam indices into symbols, as indicated by block 301. As described above with reference to FIG. 1, the UE 103 has a plurality of UE antenna ports 115 that are electrically coupled to a plurality of UE antenna elements, and each plurality of UE antenna elements comprises a respective UE antenna array 128. The UE 103 uses the beam indices to obtain UE antenna element weights that are used by analog beam former circuits 127 of the UE 103 to weight the UE antenna elements to thereby selectively control time-variant UE antenna beam patterns 129 that are formed by the respective UE antenna arrays 128, as indicated by block 302.

With an RC emulator 102 having a dynamically-variable channel model 120 that is configured to be dynamically varied in accordance with the beam indices, signals that are output from the UE antenna ports 115 and that contain the beam indices are received at RC I/O ports 113 of the RC emulator 102, as indicated by block 303. As indicated above with reference to FIG. 1, the RC emulator 102 preferably samples at least one of the signals that are output from one of the UE antenna ports 115 and received by a respective one of the RC I/O ports 113 to perform frame and symbol synchronization to synchronize the RC emulator 102 with the UE 103. In the RC emulator 102, the dynamically-variable channel model 120 models the time-variant antenna beam patterns 129 that are formed by the respective UE antenna arrays 128 and generates time-variant signals, as indicated by block 304. The RC emulator 102 performs RC emulation operations on the time-variant signals and outputs faded time-variant output signals from RC I/O ports 111 of the RC emulator 102 to BS antenna ports 106 of the BS 101, as indicated by block 305. The faded time-variant output signals can be used to assess, or evaluate, receiver characteristics of the DUT, which in this case is the BS 101. Because the test system 100 is bidirectional, downlink testing (BS 101 transmitting and UE 103 receiving) can be performed in the same manner using the same system configuration to evaluate transmitter characteristics of the BS 101.

Figure 4:
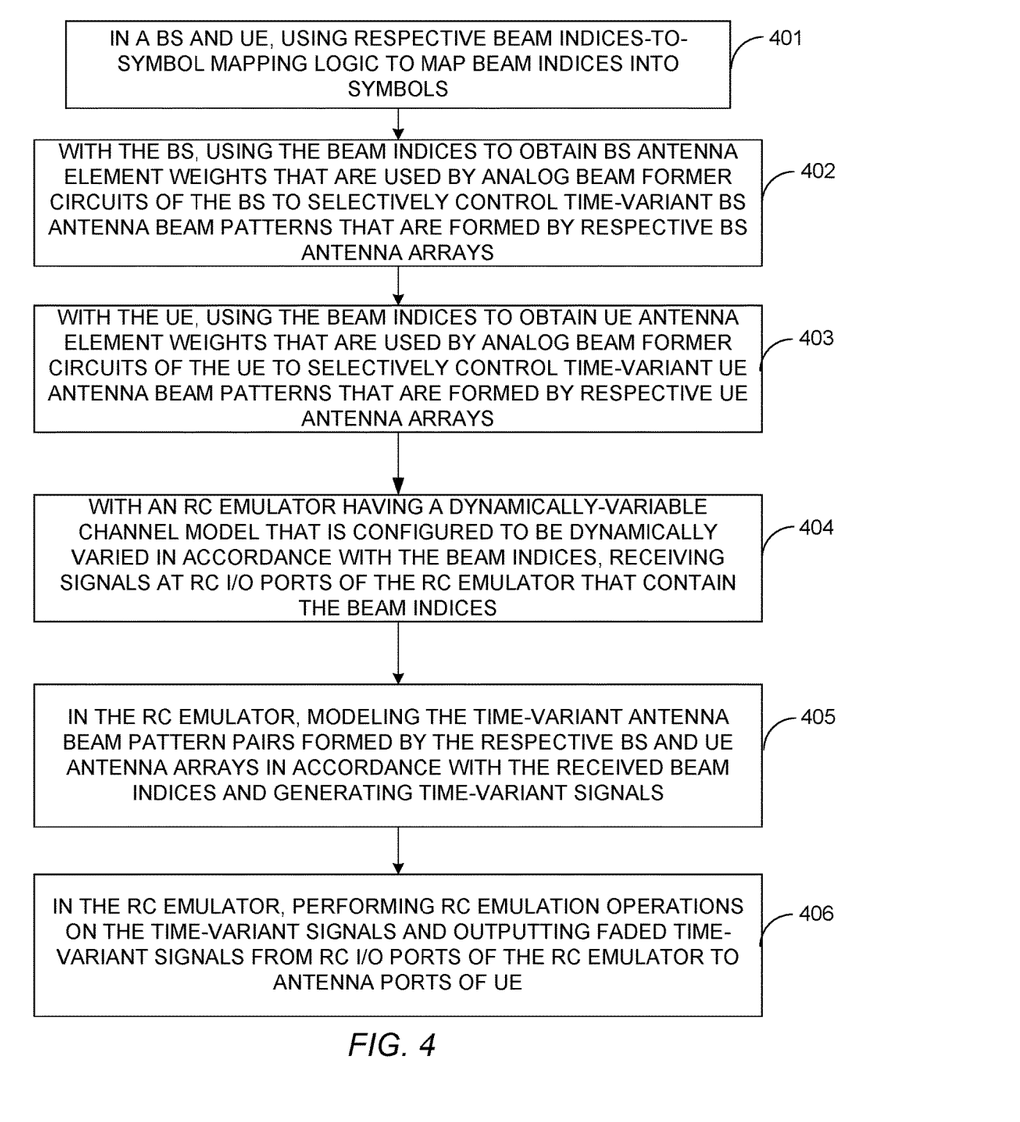
FIG. 4 is a flow diagram representing the test method in accordance with a representative embodiment in which the BS is the DUT and in which the dynamically-variable channel model shown in FIG. 1 models pairs of antenna beam patterns, where each beam pattern pair is made up of antenna array beam pattern formed by a BS antenna array and an antenna array beam pattern formed by a UE antenna array.

FIG. 4 is a flow diagram representing the test method in accordance with a representative embodiment in which the BS 101 is the DUT (i.e., downlink testing of transmitter characteristics of the BS 101) and the dynamically-variable channel model 120 is configured to be dynamically varied in accordance with Tx/Rx beam index pairs. In other words, the dynamically-variable channel model 120 models antenna array beam pattern pairs, where each antenna array beam pattern pair is made up of a BS antenna array beam pattern 109 and a corresponding UE antenna array beam pattern 129. In a BS 101 and the UE 103, respective beam indices-to-symbol mapping logic 105, 125 is used to map beam indices into symbols, as indicated by block 401. The BS 101 and the UE 103 use the beam indices to obtain BS and UE antenna element weights that are used by BS and UE analog beam former circuits 107 and 127, respectively, of the BS 101 and the UE 103, respectively, to weight the BS and UE antenna elements to thereby selectively control time-variant BS and UE antenna beam patterns 109 and 129, respectively, that are formed by the respective BS and UE antenna arrays 109 and 129, as indicated by blocks 402 and 403. With an RC emulator 102 having a dynamically-variable channel model 120 that is configured to be dynamically varied in accordance with the beam indices, signals that are output from the BS and UE antenna ports 106 and 115, respectively, and that contain the beam indices are received at RC I/O ports 111 and 113, respectively, of the RC emulator 102, as indicated by block 404. As indicated above, the RC emulator 102 preferably samples at least one of the signals received from the BS 101 to perform frame and symbol synchronization to synchronize the BS 101 with the RC emulator 102.

In the RC emulator 102, the dynamically-variable channel model 120 models the time-variant antenna beam pattern pairs that are formed by the respective BS and UE antenna arrays 108 and 128, respectively, and generates time-variant signals, as indicated by block 405. The RC emulator 102 performs RC emulation operations on the time-variant signals and outputs faded time-variant output signals from RC I/O ports 113 of the RC emulator 102 to the UE antenna ports 115 of the UE 103, as indicated by block 406. The faded time-variant output signals can be used to assess, or evaluate, transmitter characteristics of the DUT, which in this case is the BS 101. Because the test system 100 is bidirectional, uplink testing (UE 103 transmitting and BS 101 receiving) can be performed in the same manner using the same system configuration to evaluate receiver characteristics of the BS 101.

Figure 5:
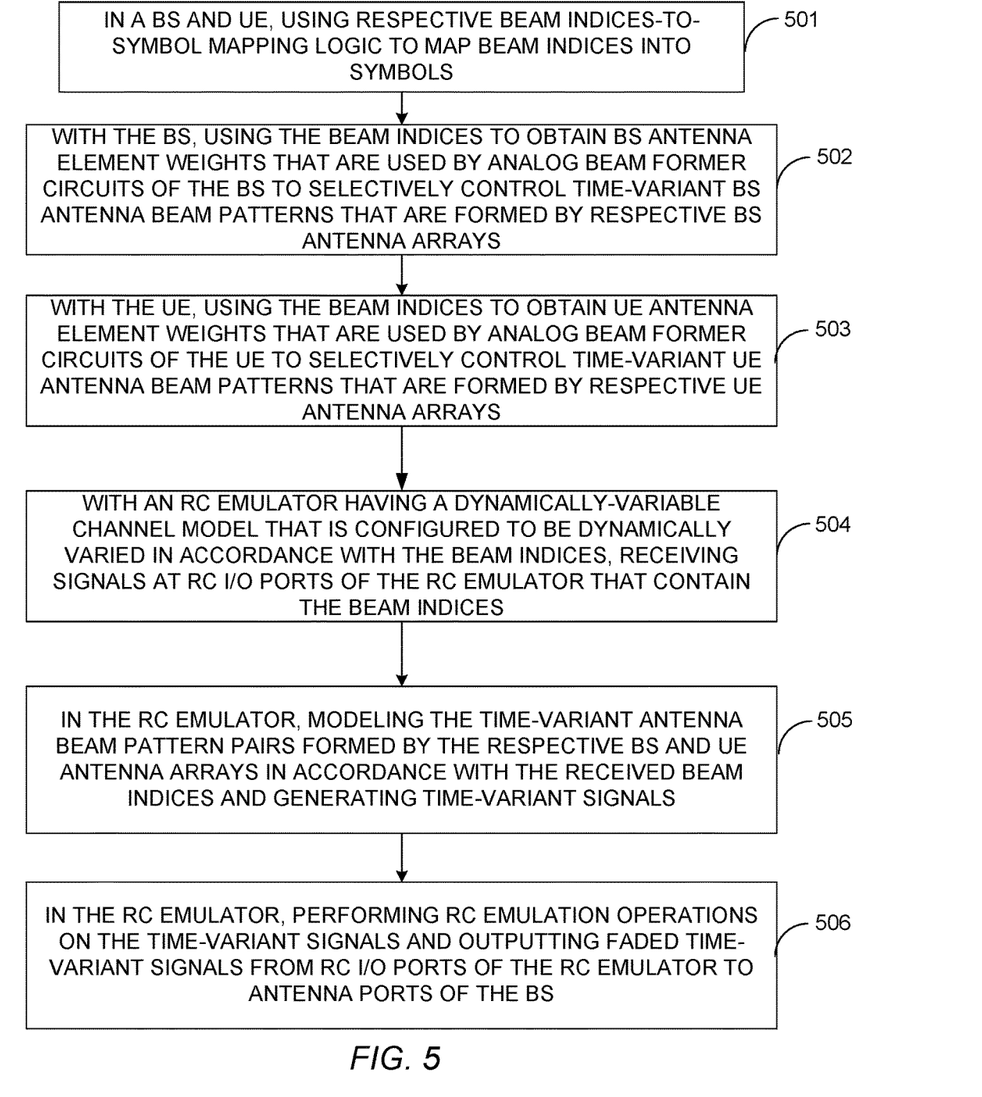
FIG. 5 is a flow diagram representing the test method in accordance with a representative embodiment in which the UE is the DUT and the dynamically-variable channel model 120 is configured to be dynamically varied in accordance with Tx/Rx beam index pairs.

FIG. 5 is a flow diagram representing the test method in accordance with a representative embodiment in which the UE 103 is the DUT (i.e., uplink testing of transmitter characteristics of the UE 103) and the dynamically-variable channel model 120 is configured to be dynamically varied in accordance with Tx/Rx beam index pairs. In other words, the dynamically-variable channel model models antenna array beam pattern pairs, where each antenna array beam pattern pair is made up of a BS antenna array beam pattern 109 and a corresponding UE antenna array beam pattern 129. In a BS 101 and the UE 103, respective beam indices-to-symbol mapping logic 105 and 125 is used to map beam indices into symbols, as indicated by block 501. The BS 101 and the UE 103 use the beam indices to obtain BS and UE antenna element weights that are used by BS and UE analog beam former circuits 107 and 127, respectively, of the BS 101 and of the UE 103 to weight the BS and UE antenna elements to thereby selectively control time-variant BS and UE antenna beam patterns 109 and 129, respectively, that are formed by the respective BS and UE antenna arrays 108 and 128, respectively, as indicated by blocks 502 and 503. With an RC emulator 102 having a dynamically-variable channel model 120 that is configured to be dynamically varied in accordance with the beam indices, signals that are output from the BS and UE antenna ports 106 and 115, respectively, and that contain the beam indices are received at RC I/O ports 111 and 113, respectively, of the RC emulator 102, as indicated by block 504. As indicated above, the RC emulator 102 preferably samples at least one of the signals received from the BS 101 to perform frame and symbol synchronization to synchronize the BS 101 with the RC emulator 102.

In the RC emulator 102, the dynamically-variable channel model 120 models the time-variant antenna beam pattern pairs that are formed by the respective BS and UE antenna arrays 108 and 128, respectively, and generates time-variant signals, as indicated by block 505. The RC emulator 102 performs RC emulation operations on the time-variant signals and outputs faded time-variant output signals from RC I/O ports 111 of the RC emulator 102 to BS antenna ports 106 of the BS 101, as indicated by block 506. The faded time-variant output signals can be used to assess, or evaluate, transmitter characteristics of the DUT, which in this case is the UE 103. Because the test system 100 is bidirectional, downlink testing of the UE (UE 103 receiving and BS 101 transmitting) can be performed in the same manner using the same system configuration to evaluate receiver characteristics of the UE 103.

Figure 6:
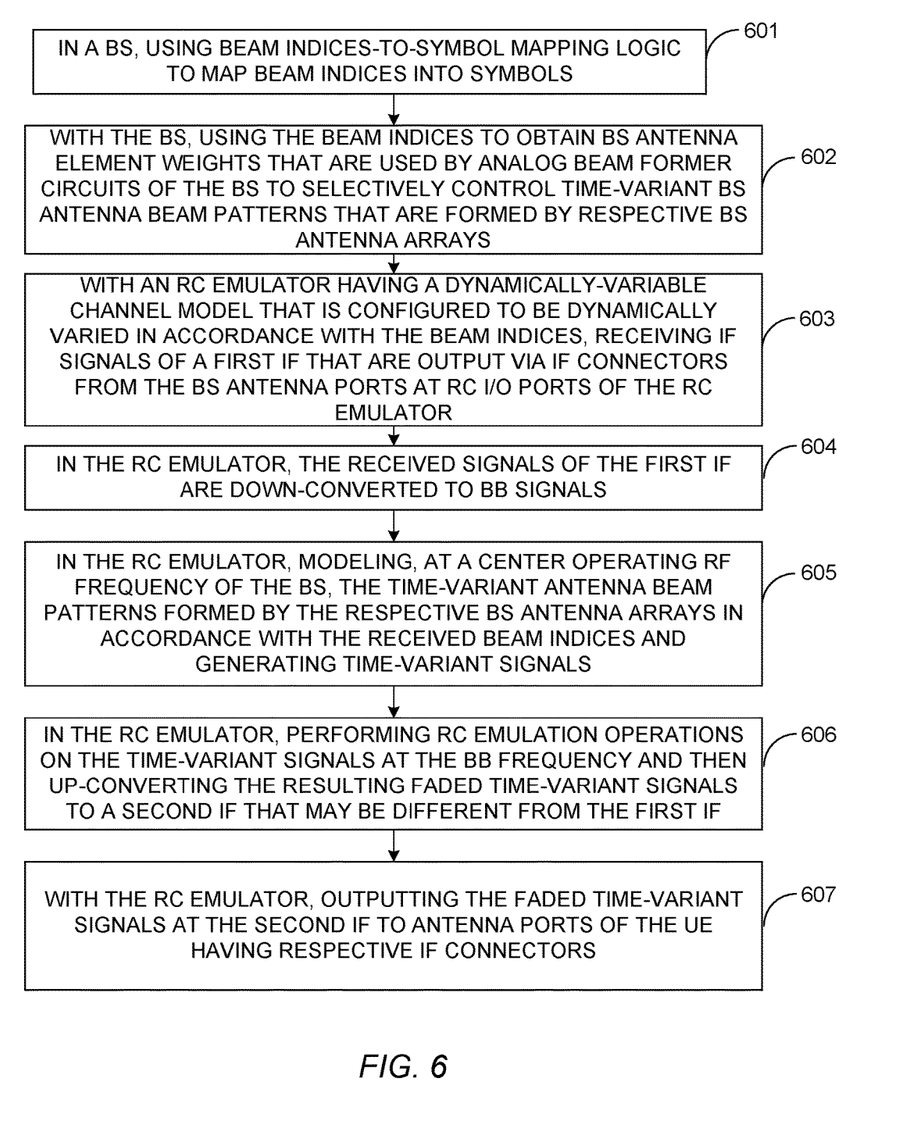
FIG. 6 is a flow diagram that is a modification of the flow diagram shown in FIG. 4 to represent the test method in accordance with a representative embodiment in which the BS is the DUT and the test method is being used to evaluate transmitter characteristics of the BS for the case in which the BS and the UE have IF connectors per antenna port, but do not have RF connectors.

FIG. 6 is a flow diagram that is a modification of the flow diagram shown in FIG. 4 to represent the test method in accordance with a representative embodiment in which the BS 101 is the DUT and the BS 101 and the UE 103 have IF connectors per antenna port 106 and 115, respectively, but do not have RF connectors. In such cases, RC emulation is performed by the RC emulator 102 at the BB frequency and modelling by the dynamically-variable channel model 120 of the RC emulator 102 is performed at the center operating RF frequency of the BS 101. The signals that are transmitted from the BS 101 to the RC emulator 102 are at a first IF and the signals that are transmitted from the RC emulator 102 to the UE 103 are at a second IF, where the first and second IFs may be different.

In a BS 101, beam indices-to-symbol mapping logic 105 is used to map beam indices into symbols, as indicated by block 601. The BS 101 uses the beam indices to obtain BS antenna element weights that are used by BS analog beam former circuits 107 of the BS 101 to weight the BS antenna elements to thereby selectively control time-variant BS antenna beam patterns 109 that are formed by the respective BS antenna arrays 108, as indicated by block 602. With an RC emulator 102 having a dynamically-variable channel model 120 that is configured to be dynamically varied in accordance with the beam indices, signals of a first IF that are output via IF connectors of the BS 101 from the BS antenna ports 106 and that contain the beam indices are received at RC I/O ports 111 of the RC emulator 102, as indicated by block 603. The RC emulator 102 preferably samples at least one of the signals of the first IF received from the BS 101 to perform frame and symbol synchronization in the manner described above to synchronize the BS 101 with the RC emulator 102.

In the RC emulator 102, the received signals of the first IF are down-converted into BB signals, as indicated by block 604. In the RC emulator 102, the dynamically-variable channel model 120 models the time-variant antenna beam patterns 109 that are formed by the respective BS antenna arrays 108 at a center operating RF frequency of the BS 101 and generates time-variant signals, as indicated by block 605. The RC emulator 102 performs RC emulation operations at the BB frequency on the time-variant signals and then up-converts the resulting faded time-variant BB signals into faded time-variant signals at a second IF that may be, but need not be, different from the first IF, as indicated by block 606. The RC emulator 102 outputs the faded time-variant signals at the second IF from RC I/O ports 113 of the RC emulator 102 to antenna ports 115 of the UE 103 having IF connectors, as indicated by block 607.

The flow diagrams of FIG. 3 can be modified in a manner similar to the manner in which the flow diagram of FIG. 6 is a modification of the flow diagram of FIG. 4 for the case described above in which the BS 101 and the UE 103 have IF connectors per antenna port, but do not have RF connectors. In the interest of brevity, such modifications to the flow diagram of FIG. 3 is not shown or described herein, as persons of skill in the art will understand the manner in which such modifications may be made.

It should be noted that while the representative embodiments described above show the BS and UE antenna ports 106 and 115, respectively, connected to the RC emulator 102 via electrical cables 112 and 114, respectively, these cabled connections can be replaced with wireless connections, e.g., wireless cable connectivity. For example, one link end may be connected conductively, i.e, with an electrical cable 112 or 114, and the opposite link end may have an over-the-air (OTA) interface (e.g., far-field or near-field OTA or wireless cable interface). For example, there may be an OTA interface of the RC emulator 102 with the DUT to allow for radiated testing of the DUT.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the inventive principles and concepts are not limited to the disclosed embodiments. Other variations to the disclosed embodiments can be understood and effected by those skilled in the art, from a study of the drawings, the disclosure, and the appended claims.

What is claimed is:

1. A test system for testing a device under test (DUT), the test system comprising:
a base station (BS) configured to selectively control BS antenna elements electrically coupled to BS antenna ports in accordance with beam indices, each of a plurality of BS antenna arrays of the BS comprising a plurality of the BS antenna elements;
mapping logic of the BS configured to map beam indices into symbols;
BS analog beam former circuits of the BS weighting the BS antenna elements based on the beam indices to cause time-variant BS antenna array beam patterns to be formed by the BS antenna arrays; and
a radio channel (RC) emulator having a first plurality of RC input/output (I/O) ports electrically coupled to respective BS antenna ports and having a second plurality of RC I/O ports that are electrically coupled to respective user equipment (UE) antenna ports of UE, the first plurality of RC I/O ports receiving signals that are output from the respective BS antenna ports and that contain information from which the beam indices are obtained by the RC emulator, the RC emulator having a dynamically-variable channel model that is configured to be dynamically varied in accordance with the beam indices, the dynamically-variable channel model modeling the time-variant BS antenna array beam patterns that are formed by the respective BS antenna arrays and generating time-variant signals, and wherein the RC emulator performs RC emulation operations on the time-variant signals generated by the dynamically-variable channel model to produce faded time-variant signals that are output from the second plurality of RC I/O ports to the UE antenna ports.

2. The test system of claim 1, wherein the RC emulator is configured to perform frame and symbol synchronization to synchronize the RC emulator with the BS.

3. The test system of claim 2, wherein the RC emulator is configured to sample at least one of the signals that are output from the BS antenna ports to perform frame and symbol synchronization to synchronize the RC emulator with the BS.

4. The test system of claim 2, wherein the RC emulator performs frame and symbol synchronization based on a trigger signal received in the RC emulator from the BS or BS emulator.

5. The test system of claim 2, wherein the RC emulator is configured to extract beam state information from the signals that are output from the BS antenna ports after performing frame and symbol synchronization, and wherein the RC emulator is configured to emulate the dynamically-variable channel model on one or more channels of the RC emulator using the extracted beam state information and using channel model coefficients that are calculated based at least in part on the extracted beam state information.

6. The test system of claim 5, wherein the RC emulator is configured to decode the signals that are output from the BS antenna ports in order to extract the beam state information from the signals.

7. The test system of claim 1, wherein the beam indices have a corresponding beam state sequence, and wherein the corresponding beam state sequence is known to the RC emulator in advance of testing.

8. The test system of claim 1, wherein a beam state sequence to be used by the dynamically-variable channel model in modeling the time-variant BS antenna array beam patterns is dynamically scheduled by the BS.

9. The test system of claim 8, wherein the RC emulator decodes beam state scheduling information from the signals that are output from the BS antenna ports and uses the beam state scheduling information to obtain a beam state sequence to be used by the dynamically-variable channel model in modeling the time-variant BS antenna array beam patterns.

10. The test system of claim 1, wherein the dynamically-variable channel model models multiple beam-specific channel models in parallel in the RC emulator.

11. The test system of claim 10, wherein only one of the beam-specific channel models is active at any given time instant.

12. The test system of claim 11, wherein the multiple beam-specific channel models are modeled on different physical channels of the RC emulator, and wherein the different physical channels are switched on or off based on which beam-specific channel model is active at a given time instant.

13. The test system of claim 10, wherein the multiple beam-specific channel models are modeled on a single physical channel of the RC emulator, and wherein channel taps assigned to each beam-specific channel model are enabled or disabled based on which beam-specific channel model is active at a given time instant.

14. The test system of claim 1, wherein the RC I/O ports of the first plurality of RC I/O ports are electrically coupled to the respective BS antenna ports via intermediate frequency (IF) connectors of the BS, and wherein the RC I/O ports of the second plurality of RC I/O ports are electrically coupled to the respective UE antenna ports via IF connectors of the UE or UE emulator, and wherein the signals that are output from the BS antenna ports are at a first IF, and wherein the faded time-variant signals that are output from the second plurality of RC I/O ports to the UE antenna ports are at a second IF.

15. The test system of claim 14, wherein the RC emulation operations are performed at a baseband (BB) frequency, and wherein the modeling of the time-variant BS antenna array beam patterns by the dynamically-variable channel model is performed at a center operating radio frequency (RF) of the BS.

16. A test system for testing a device under test (DUT), the test system comprising:
user equipment (UE) configured to selectively control UE antenna elements that are electrically coupled to UE antenna ports in accordance with beam indices, each of a plurality of UE antenna arrays comprising a plurality of the UE antenna elements;
mapping logic of the UE configured to map beam indices into symbols;
UE analog beam former circuits of the UE weighting the UE antenna elements based on the beam indices to cause time-variant UE antenna array beam patterns to be formed by the UE antenna arrays; and
a radio channel (RC) emulator having a first plurality of RC input/output (I/O) ports electrically coupled to respective UE antenna ports and having a second plurality of RC I/O ports that are electrically coupled to respective BS antenna ports of the BS, the first plurality of RC I/O ports receiving signals that are output from the respective UE antenna ports and that contain information from which the beam indices are obtained by the RC emulator, the RC emulator having a dynamically-variable channel model that is configured to be dynamically varied in accordance with the beam indices, the dynamically-variable channel model modeling the time-variant UE antenna array beam patterns that are formed by the respective UE antenna array and generating time-variant signals, and wherein the RC emulator performs RC emulation operations on the time-variant signals generated by the dynamically-variable channel model to produce faded time-variant signals that are output from the second plurality of RC I/O ports to the BS antenna ports.

17. The test system of claim 16, wherein the RC emulator is configured to perform frame and symbol synchronization to synchronize the RC emulator with the BS.

18. The test system of claim 17, wherein the RC emulator is configured to sample at least one of the signals that are output from the BS antenna ports to perform frame and symbol synchronization to synchronize the RC emulator with the BS.

19. The test system of claim 17, wherein the RC emulator performs frame and symbol synchronization based on a trigger signal received in the RC emulator from the BS or BS emulator.

20. The test system of claim 17, wherein the RC emulator is configured to extract beam state information from the signals that are output from the UE antenna ports after performing frame and symbol synchronization, and wherein the RC emulator is configured to emulate the dynamically-variable channel model on one or more channels of the RC emulator using the extracted beam state information and using channel model coefficients that are calculated based at least in part on the extracted beam state information.

21. The test system of claim 20, wherein the RC emulator is configured to decode the signals that are output from the UE antenna ports in order to extract the beam state information from the signals.

22. The test system of claim 16, wherein the beam indices have a corresponding beam state sequence, and wherein the corresponding beam state sequence is known to the RC emulator in advance of testing.

23. The test system of claim 16, wherein a beam state sequence to be used by the dynamically-variable channel model in modeling the time-variant UE antenna array beam patterns is dynamically assigned by the UE during testing.

24. The test system of claim 23, wherein the RC emulator decodes beam state scheduling information from the signals that are output from the UE antenna ports and uses the beam state scheduling information to obtain a beam state sequence to be used by the dynamically-variable channel model in modeling the time-variant UE antenna array beam patterns.

25. The test system of claim 16, wherein the dynamically-variable channel model models multiple beam-specific channel models in parallel in the RC emulator.

26. The test system of claim 25, wherein only one of the beam-specific channel models is active at any given time instant.

27. The test system of claim 26, wherein the multiple beam-specific channel models are modeled on different physical channels of the RC emulator, and wherein the different physical channels are switched on or off based on which beam-specific channel model is active at a given time instant.

28. The test system of claim 25, wherein the multiple beam-specific channel models are modeled on a single physical channel of the RC emulator, and wherein channel taps assigned to each beam-specific channel model are enabled or disabled based on which beam-specific channel model is active at a given time instant.

29. A test system for testing a device under test (DUT), the test system comprising:
- a base station (BS) configured to selectively control BS antenna elements electrically coupled to BS antenna ports in accordance with BS beam indices, each of a plurality of BS antenna arrays of the BS comprising a plurality of the BS antenna elements;
- mapping logic of the BS configured to map the BS beam indices into symbols;
- BS analog beam former circuits of the BS weighting the BS antenna elements based on the BS beam indices to cause time-variant BS antenna array beam patterns to be formed by the BS antenna arrays;
- user equipment (UE) configured to selectively control UE antenna elements that are electrically coupled to UE antenna ports in accordance with UE beam indices, each of a plurality of UE antenna arrays comprising a plurality of the UE antenna elements;
- mapping logic of the UE configured to map the UE beam indices into symbols;
- UE analog beam former circuits of the UE weighting the UE antenna elements based on the UE beam indices to cause time-variant UE antenna array beam patterns to be formed by the UE antenna arrays; and
- a radio channel (RC) emulator having a first plurality of RC input/output (I/O) ports electrically coupled to respective UE antenna ports and having a second plurality of RC I/O ports that are electrically coupled to respective BS antenna ports of the BS, the RC emulator having a dynamically-variable channel model that is dynamically varied in accordance with the BS and UE beam indices to generate time-variant signals, and wherein the RC emulator performs RC emulation operations on the time-variant signals generated by the dynamically-variable channel model to produce faded time-variant signals that are output from the second plurality of RC I/O ports to the BS antenna ports.

30. A test method for testing a device under test (DUT), the test method comprising:
- in a transmitter, using first beam indices to obtain transmitter antenna element weights that are used by first analog beam former circuits of the transmitter to weight the transmitter antenna elements to cause time-variant transmitter antenna beam patterns to be formed by transmitter antenna arrays;
- in a receiver, using second beam indices to obtain receiver antenna element weights that are used by second analog beam former circuits of the receiver to weight the transmitter antenna elements to cause time-variant receiver antenna beam patterns to be formed by receiver antenna arrays;
- with a radio channel (RC) emulator having a first plurality of RC input/output (I/O) ports electrically coupled to respective transmitter antenna ports and having a second plurality of RC I/O ports electrically coupled to respective antenna ports of a receiver, dynamically varying a dynamically-variable channel model of the RC emulator in accordance with the first and second beam indices;
- in the RC emulator, modeling the time-variant antenna beam patterns formed by the transmitter and receiver antenna arrays and generating time-variant signals; and
- in the RC emulator, performing emulation operations on the time-variant signals and outputting faded time-variant signals from the second plurality of RC I/O ports to the respective receiver antenna ports.

31. The test method of claim 30, wherein the transmitter is part of a base station emulator that includes the RC emulator.

* * * * *